United States Patent
Maehara (10) Patent No.: US 11,873,893 B2
(45) Date of Patent: Jan. 16, 2024

(54) SHIFT CONTROL DEVICE

(71) Applicant: SUBARU CORPORATION, Tokyo (JP)

(72) Inventor: Kazufumi Maehara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/144,515

(22) Filed: May 8, 2023

(65) Prior Publication Data

US 2023/0383837 A1 Nov. 30, 2023

(30) Foreign Application Priority Data

May 24, 2022 (JP) .................. 2022-084598

(51) Int. Cl.
*F16H 61/02* (2006.01)
*F16H 59/18* (2006.01)
*F16H 59/24* (2006.01)
*F16H 59/60* (2006.01)
*F16H 61/10* (2006.01)
(Continued)

(52) U.S. Cl.
CPC ......... *F16H 61/0213* (2013.01); *B60W 10/04* (2013.01); *B60W 10/06* (2013.01); *B60W 10/10* (2013.01); *B60W 10/11* (2013.01); *F16H 59/18* (2013.01); *F16H 59/24* (2013.01); *B60W 10/02* (2013.01); *B60W 2555/00* (2020.02); *B60W 2555/60* (2020.02); *F02D 29/00* (2013.01); *F16H 59/60* (2013.01); *F16H 61/10* (2013.01); *F16H 61/21* (2013.01); *F16H 61/68* (2013.01); *F16H 63/50* (2013.01); *F16H 63/502* (2013.01); *F16H 2059/183* (2013.01); *F16H 2061/0234* (2013.01)

(58) Field of Classification Search
CPC .......... F16H 59/18; F16H 59/24; F16H 59/60; F16H 60/0213; F16H 60/10; F16H 60/21; F16H 60/68; F16H 63/50; F16H 63/502; F16H 2061/0234; B60W 10/02; B60W 10/04; B60W 10/06; B60W 10/10; B60W 10/11; F02D 29/00
See application file for complete search history.

(56) References Cited

U.S. PATENT DOCUMENTS

2010/0324796 A1* 12/2010 Takeuchi ............... G01C 21/26
 701/70
2020/0348669 A1* 11/2020 Kim ........................ G01C 21/20

FOREIGN PATENT DOCUMENTS

JP 2008-222175 A1 9/2008

* cited by examiner

Primary Examiner — Tinh Dang
(74) Attorney, Agent, or Firm — TROUTMAN PEPPER HAMILTON SANDERS LLP (57) ABSTRACT

A shift control device to be applied to a vehicle provided with an automatic transmission includes a detector and a shift mode control processor. The detector detects that the vehicle has passed through a tollgate through which the vehicle is able to pass without stopping. The shift mode control processor switches a shift mode of the vehicle from a first shift mode to a second shift mode the shift mode of the vehicle upon passing through the tollgate is the first shift mode and a predetermined condition regarding one or both of a speed of the vehicle and an accelerator opening degree of the vehicle is satisfied after the vehicle passes through the tollgate. In the first shift mode, a shift operation is performable by a driver, and in the second shift mode, a shift operation is performable by the automatic transmission.

6 Claims, 7 Drawing Sheets

(51) Int. Cl.
*F16H 61/68* (2006.01)
*F16H 63/50* (2006.01)
*B60W 10/04* (2006.01)
*B60W 10/10* (2012.01)
*B60W 10/11* (2012.01)
*B60W 10/02* (2006.01)
*B60W 10/06* (2006.01)
*F16H 61/21* (2006.01)
*F02D 29/00* (2006.01)

SHIFT CONTROL DEVICE

CROSS-REFERENCE TO RELATED APPLICATION

The present application claims priority from Japanese Patent Application No. 2022-084598 filed on May 24, 2022, the entire contents of which are hereby incorporated by reference.

BACKGROUND

The disclosure relates to a shift control device that performs shift control of a vehicle.

In vehicles provided with automatic transmissions, speed ratios are controlled based on various conditions. Japanese Unexamined Patent Application Publication No. 2008-222175, for example, discloses a technique that selects a speed ratio lower than a normal speed ratio when a vehicle passes through a tollgate of an electronic toll collection (ETC) system.

SUMMARY

An aspect of the disclosure provides a shift control device to be applied to a vehicle provided with an automatic transmission. The shift control device includes a detector and a shift mode control processor. The detector is configured to detect that the vehicle has passed through a tollgate. The tollgate is through which the vehicle is able to pass without stopping. The shift mode control processor is configured to switch a shift mode of the vehicle from a first shift mode to a second shift mode when the shift mode of the vehicle upon passing through the tollgate is the first shift mode and a predetermined condition regarding one or both of a speed of the vehicle and an accelerator opening degree of the vehicle is satisfied after the vehicle passes through the tollgate. The first shift mode is a mode in which a shift operation is performable by a driver who drives the vehicle, and the second shift mode is a mode in which a shift operation is performable by the automatic transmission.

An aspect of the disclosure provides a shift control device to be applied to a vehicle provided with an automatic transmission. The shift control device includes circuitry configured to: detect that the vehicle has passed through a tollgate; and switch a shift mode of the vehicle from a first shift mode to a second shift mode in a case where the shift mode of the vehicle upon passing through the tollgate is the first shift mode and where a predetermined condition regarding one or both of a speed of the vehicle and an accelerator opening degree of the vehicle is satisfied after the vehicle passes through the tollgate. The tollgate is through which the vehicle is able to pass without stopping. The first shift mode is a mode in which a shift operation is performable by a driver who drives the vehicle, and the second shift mode is a mode in which a shift operation is performable by the automatic transmission.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

There is a demand for a vehicle provided with an automatic transmission to perform a shift operation as intended by a driver when passing through a tollgate.

It is desirable to provide a shift control device that is able to perform a shift operation as intended by a driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
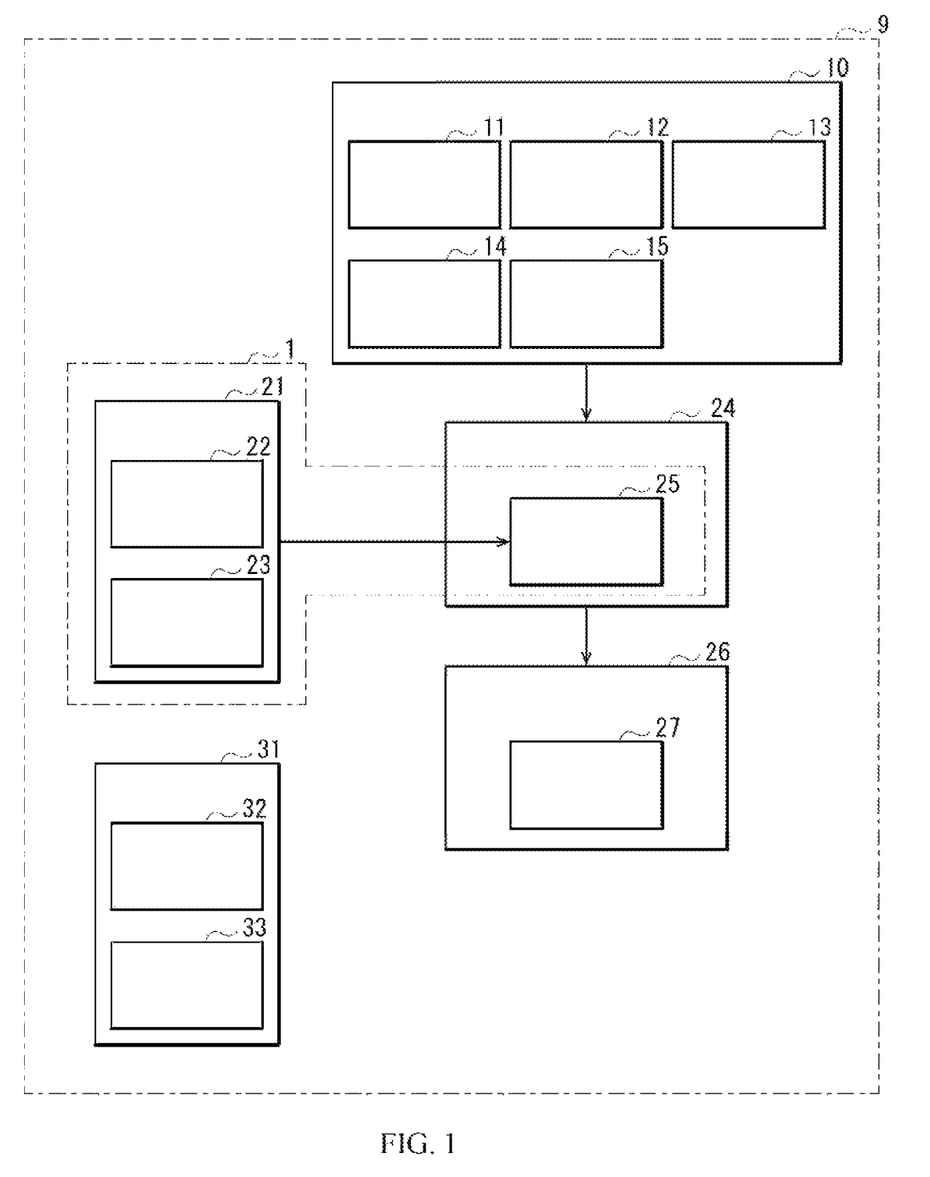
FIG. 1 is a block diagram illustrating an exemplary configuration of a vehicle including a shift control device according to one example embodiment of the disclosure.

FIG. 1 illustrates an exemplary configuration of a vehicle 9 including a shift control device according to an example embodiment. The vehicle 9 may be a vehicle provided with an automatic transmission, and may include a driving operation unit 10, a navigation unit 21, a traveling control unit 24, a traveling mechanism unit 26, and an ETC in-vehicle device 31.

The driving operation unit 10 may receive a driving operation performed by a driver who drives the vehicle 9. The driving operation unit 10 may include a steering wheel 11, an accelerator pedal 12, a brake pedal 13, a shift lever 14, and a paddle 15.

The steering wheel 11 may receive a steering operation performed by the driver. The accelerator pedal 12 may receive an accelerating operation performed by the driver. The brake pedal 13 may receive a braking operation performed by the driver.

The shift lever 14 may receive a shift operation performed by the driver. The driver may operate the shift lever 14 to thereby perform switching to one of multiple ranges including, for example, a parking range, a neutral range, a drive range, and a reverse range. An automatic transmission 27, to be described later, of the vehicle 9 may thus perform the shift operation corresponding to the selected range.

The paddle 15 may receive the shift operation performed by the driver. The driver may operate the paddle 15 to thereby change a speed ratio in the automatic transmission 27, to be described later, of the vehicle 9. The automatic transmission 27 of the vehicle 9 may perform the shift operation at the speed ratio corresponding to the paddle operation performed by the driver.

The navigation unit 21 may determine a route to a destination (a scheduled traveling route) on which the vehicle 9 is to travel and may provide the driver with information to thereby guide the vehicle 9 along the determined route. The navigation unit 21 may include a global navigation satellite system (GNSS) receiver 22 and a navigation processor 23. The GNSS receiver 22 may acquire a position of the vehicle 9 on the ground using a GNSS such as a global positioning system (GPS). The navigation processor 23 may determine the scheduled traveling route of the vehicle 9 using a map information database including information regarding a road map. The navigation processor 23 may include, for example, a storage that stores the map information database, and may determine the scheduled traveling route using the map information database stored in the storage. Alternatively, the navigation processor 23 may include a communicator that communicates with a network server storing the map information database, for example, and may determine the scheduled traveling route based on the information acquired from the network server. The navigation unit 21 may include, for example, a user interface such as a display panel, a touch panel, or various buttons. Thus, for example, the navigation unit 21 may determine the scheduled traveling route to the destination based on information regarding the destination entered by the driver by operating the user interface, and may provide the driver with the information regarding the determined route using the user interface.

Further, in a case where the navigation unit 21 detects that there is a tollgate of an ETC system ahead of the vehicle 9, the navigation unit 21 may notify the traveling control unit 24 of the detection. In addition, when the vehicle 9 passes through the tollgate of the ETC system, the navigation unit 21 may notify the traveling control unit 24 of that fact.

The traveling control unit 24 may control traveling of the vehicle 9 by controlling an operation of the traveling mechanism unit 26 based on a driver's driving operation received by the driving operation unit 10. The traveling control unit 24 may include one or more electronic control units (ECUs), for example.

The traveling control unit 24 may include a shift mode control processor 25. The shift mode control processor 25 may set a shift mode of the automatic transmission 27, to be described later, of the vehicle 9. There may be multiple shift modes settable by the shift mode control processor 25, and the multiple shift modes may include, for example, a shift mode MD and a shift mode MM. The shift mode MD may be a shift mode that is to be set in a case where the driver switches the shift lever 14 to the drive range, and may be a mode in which the speed ratio is automatically switched in accordance with, for example, a speed of the vehicle 9 or a rotating speed of an engine. The shift mode MM may be a shift mode that is to be temporarily set in a case where the driver operates the paddle 15, and may be a mode in which the speed ratio is switched in accordance with the paddle operation performed by the driver. The shift mode control processor 25 may control the shift mode based on the notification from the navigation unit 21. The navigation unit 21 and the shift mode control processor 25 may constitute a shift control device 1.

The traveling mechanism unit 26 may include, for example, an engine, a transmission mechanism, a steering mechanism, a brake mechanism, and wheels. The traveling mechanism unit 26 may operate in accordance with a command from the traveling control unit 24. Operating the traveling mechanism unit 26 may cause the vehicle 9 to travel in accordance with the driver's driving operation received by the driving operation unit 10.

The traveling mechanism unit 26 may include the automatic transmission 27. The automatic transmission 27 may perform the shift operation based on the shift mode set by the shift mode control processor 25.

The ETC in-vehicle device 31 may communicate with the ETC system to thereby perform a charging process. The ETC in-vehicle device 31 may include a communicator 32 and an ETC processor 33. The communicator 32 may communicate with the ETC system. The ETC processor 33 may perform the charging process based on a result of the communication performed by the communicator 32.

In the vehicle 9, for example, in a case where the shift lever 14 is set to the drive range, the shift mode control processor 25 may set the shift mode to the shift mode MD. This may cause the automatic transmission 27 to perform a shift operation in such a manner as to automatically switch the speed ratio in accordance with the speed of the vehicle 9 or the rotating speed of the engine. In this case, for example, when the driver operates the paddle 15, the shift mode control processor 25 may switch the shift mode from the shift mode MD to the shift mode MM. This may cause the automatic transmission 27 to perform the shift operation at the speed ratio corresponding to the paddle operation performed by the driver. Thereafter, the shift mode control processor 25 may return the shift mode from the shift mode MM to the shift mode MD after a predetermined length of time has elapsed from when the driver operated the paddle 15. This may cause the automatic transmission 27 to perform the shift operation in such a manner as to automatically switch the speed ratio in accordance with the speed of the vehicle 9 or the rotating speed of the engine. As described above, the driver's operation on the paddle 15 may cause the shift mode to be temporarily turned into the shift mode MM and cause the automatic transmission 27 to perform the shift operation at the speed ratio corresponding to the driver's paddle operation. This may make it possible for the vehicle 9, for example, to accelerate or decelerate as intended by the driver. The shift mode MM may also be referred to as a temporary manual mode.

For example, when the vehicle 9 approaches the tollgate of the ETC system, the driver may operate the paddle 15 to decrease the speed ratio in some cases. The paddle operation may cause the shift mode control processor 25 to switch the shift mode from the shift mode MD to the shift mode MM. This may cause an engine brake to operate, and may make it possible to effectively decrease the speed of the vehicle 9. Thereafter, for example, after the navigation unit 21 detects that the vehicle 9 has passed through the tollgate, the shift mode control processor 25 may maintain the shift mode to be in the shift mode MM until the speed of the vehicle 9 reaches a predetermined speed. Thus, the driver may be able to increase the speed ratio by operating the accelerator pedal 12 and operating the paddle 15. As a result, the vehicle 9 may be able to accelerate as intended by the driver.

In one embodiment, the navigation unit 21 may serve as a "detector". In one embodiment, the vehicle 9 may serve as a "vehicle". In one embodiment, the automatic transmission 27 may serve as an "automatic transmission". In one embodiment, the shift mode control processor 25 may serve as a "shift mode control processor". In one embodiment, the shift mode MM may serve as a "first shift mode". In one embodiment, the shift mode MD may serve as a "second shift mode".

Next, description will be given on operations and workings of the shift control device 1 according to the example embodiment.

First, an exemplary operation of the vehicle 9 is described with reference to FIG. 1. The driving operation unit 10 may receive a driving operation performed by a driver who drives the vehicle 9. The navigation unit 21 may determine a route to a destination (a scheduled traveling route) on which the vehicle 9 is to travel and may provide the driver with information to thereby guide the vehicle 9 along the determined route. Further, when the vehicle 9 passes through a tollgate of an ETC system, the navigation unit 21 may notify the traveling control unit 24 of that fact. The traveling control unit 24 may control an operation of the traveling mechanism unit 26 based on the driver's driving operation received by the driving operation unit 10. The shift mode control processor 25 included in the traveling control unit 24 may set a shift mode of the automatic transmission 27 included in the vehicle 9. The traveling mechanism unit 26 may operate in accordance with a command from the traveling control unit 24. Operating the traveling mechanism unit 26 may cause the vehicle 9 to travel in accordance with the driver's driving operation received by the driving operation unit 10.

A shift control operation to be performed by the shift control device 1 will be described in detail below.

Figure 2:
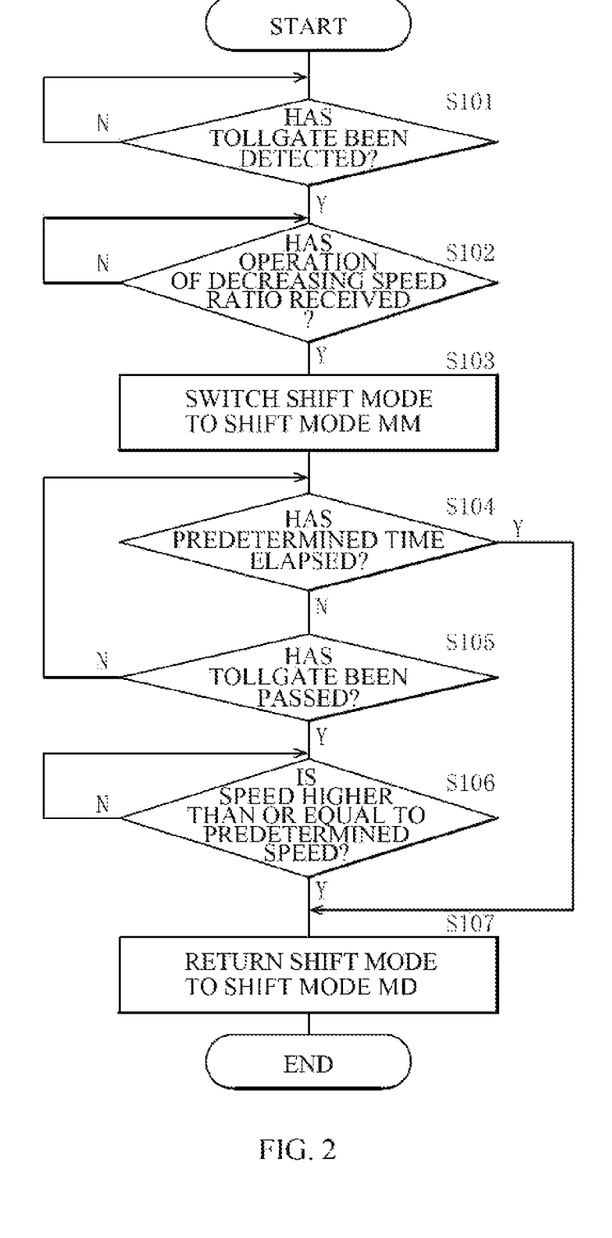
FIG. 2 is a flowchart illustrating an exemplary operation of the shift control device illustrated in FIG. 1.

FIG. 2 illustrates an exemplary operation of the shift control device 1. In this example, the shift lever 14 of the vehicle 9 may be set to the drive range.

First, the shift mode control processor 25 may check whether there is the tollgate of the ETC system ahead of the vehicle 9 based on the notification from the navigation unit 21 (step S101). If there is no tollgate ahead of the vehicle 9 ("N" in step S101), the process may repeat step S101 until the tollgate is detected ahead of the vehicle 9.

If there is the tollgate ahead of the vehicle 9 ("Y" in step S101), the shift mode control processor 25 may check whether the driving operation unit 10 has received an operation of decreasing the speed ratio on the paddle 15 (step S102). If the operation has not been received ("N" in step S102), the process may repeat step S102 until the driving operation unit 10 receives the operation.

If the driving operation unit 10 has received the operation of decreasing the speed ratio on the paddle 15 in step S102 ("Y" in step S102), the shift mode control processor 25 may switch the shift mode to the shift mode MM (step S103). This may cause the automatic transmission 27 to perform the shift operation at the speed ratio corresponding to the driver's paddle operation. In this example, the driving operation unit 10 receives the operation of decreasing the speed ratio on the paddle 15. This may cause the engine brake to operate to decrease the speed of the vehicle 9. Thereafter, the vehicle 9 may approach the tollgate.

The shift mode control processor 25 may check whether a predetermined length of time has elapsed from the reception of the operation of decreasing the speed ratio in step S102 (step S104). If the predetermined length of time has elapsed ("Y" in step S104), the process may proceed to step S107.

If the predetermined length of time has not elapsed yet in step S104 ("N" in step S104), the shift mode control processor 25 may check whether the vehicle 9 has passed through the tollgate based on the notification from the navigation unit 21 (step S105). If the vehicle 9 has not passed through the tollgate yet ("N" in step S105), the process may return to step S103.

If the vehicle 9 has passed through the tollgate ("Y" in step S105), the shift mode control processor 25 may check whether or not the speed of the vehicle 9 has become higher than or equal to a predetermined speed (step S106). For example, after the vehicle 9 passes through the tollgate, the driver may perform the accelerating operation by depressing the accelerator pedal 12. The traveling control unit 24 may accelerate the vehicle 9 based on the accelerating operation performed by the driver. The shift mode control processor 25 may check whether or not the speed of the vehicle 9 has become higher than or equal to the predetermined speed, for example, 60 km per hour. If the speed of the vehicle 9 is still lower than the predetermined speed ("N" in step S106), the process may repeat step S106 until the speed of the vehicle 9 becomes higher than or equal to the predetermined speed.

In a case where the speed of the vehicle 9 has become higher than or equal to the predetermined speed ("Y" in step S106), the shift mode control processor 25 may return the shift mode to the shift mode MD (step S107). This may cause the automatic transmission 27 to perform the shift operation in such a manner as to automatically switch the speed ratio in accordance with the speed of the vehicle 9 or the rotating speed of the engine.

This may be the end of this flow.

Figure 3:
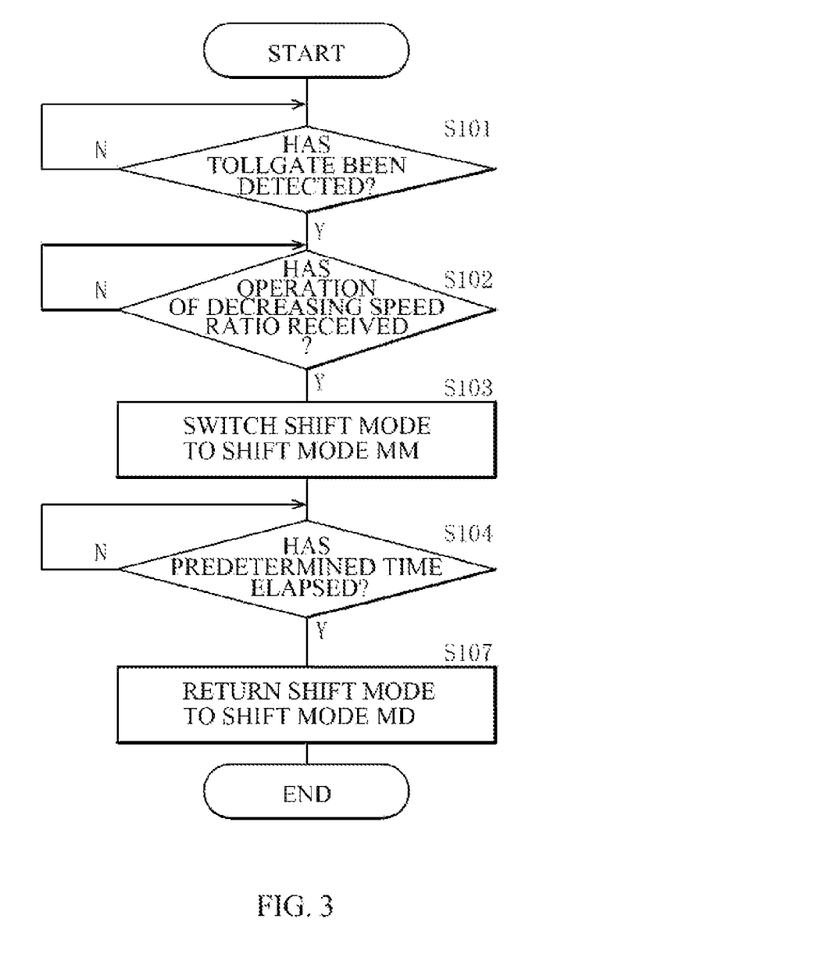
FIG. 3 is a flowchart illustrating an exemplary operation of the shift control device according to one comparative example.

As described above, the shift control device 1 includes the navigation unit 21 and the shift mode control processor 25. The navigation unit 21 is included in the vehicle 9 provided with the automatic transmission 27, and detects that the vehicle 9 has passed through a tollgate through which the vehicle 9 is able to pass without stopping. The shift mode control processor 25 switches the shift mode of the vehicle 9 from the first shift mode, i.e., the shift mode MM, to the second shift mode, i.e., the shift mode MD, in a case where the shift mode of the vehicle 9 upon passing through the tollgate is the first shift mode, i.e., the shift mode MM, and where a predetermined condition regarding the speed of the vehicle 9 is satisfied after the vehicle 9 passes through the tollgate. The first shift mode, i.e., the shift mode MM, is a mode in which the shift operation is performable by the driver who drives the vehicle 9. The second shift mode, i.e., the shift mode MD, is a mode in which the shift operation is performable by the automatic transmission 27. Accordingly, the shift control device 1 is able to perform the shift operation as intended by the driver. In other words, as illustrated in FIG. 3 for example, in a case where the shift mode is configured to return to the shift mode MD simply when a predetermined length of time has elapsed from the reception of the operation of decreasing the speed ratio in step S102, the shift control device can return the shift mode to the shift mode MD, for example, immediately after the vehicle 9 passes through the tollgate. In this case, the automatic transmission 27 may automatically switch the speed ratio in accordance with the speed of the vehicle 9 or the rotating speed of the engine, which can result in a situation that the vehicle 9 is unable to accelerate as intended by the driver. In contrast, the shift mode control processor 25 included in the shift control device 1 switches the shift mode of the vehicle 9 from the shift mode MM to the shift mode MD in which the automatic transmission 27 is able to perform the shift operation, in a case where the predetermined condition regarding the speed of the vehicle 9 is satisfied after the vehicle 9 passes through the tollgate. This makes it possible to maintain the shift mode to be in the shift mode MM during acceleration. Accordingly, the automatic transmission 27 performs the shift operation at the speed ratio corresponding to the paddle operation performed by the driver. The vehicle 9 is therefore able to accelerate as intended by the driver.

Further, in the shift control device 1, the predetermined condition may include that the speed of the vehicle 9 is higher than or equal to the predetermined speed. This makes it possible for the shift control device 1 to maintain the shift mode to be in the shift mode MM until the vehicle 9 is sufficiently accelerated. Accordingly, the automatic transmission 27 is able to perform the shift operation at the speed ratio corresponding to the paddle operation performed by the driver until the vehicle 9 is sufficiently accelerated. As a result, the shift control device 1 is able to perform the shift operation as intended by the driver. The vehicle 9 is therefore able to accelerate as intended by the driver.

According to the example embodiment described above, the navigation unit and the shift mode control processor are provided. The navigation unit is included in the vehicle provided with the automatic transmission, and detects that the vehicle has passed through the tollgate through which the vehicle is able to pass without stopping. The shift mode control processor switches the shift mode of the vehicle from the first shift mode to the second shift mode, in a case where the shift mode of the vehicle upon passing through the tollgate is the first shift mode and where the predetermined condition regarding the speed of the vehicle is satisfied after the vehicle passes through the tollgate. The first shift mode is a mode in which the shift operation is performable by the driver who drives the vehicle. The second shift mode is a mode in which the shift operation is performable by the automatic transmission. It is therefore possible to perform the shift operation as intended by the driver.

In the example embodiment described above, the predetermined condition may include that the speed of the vehicle is higher than or equal to the predetermined speed. Accordingly, it is possible to perform the shift operation as intended by the driver.

Figure 4:
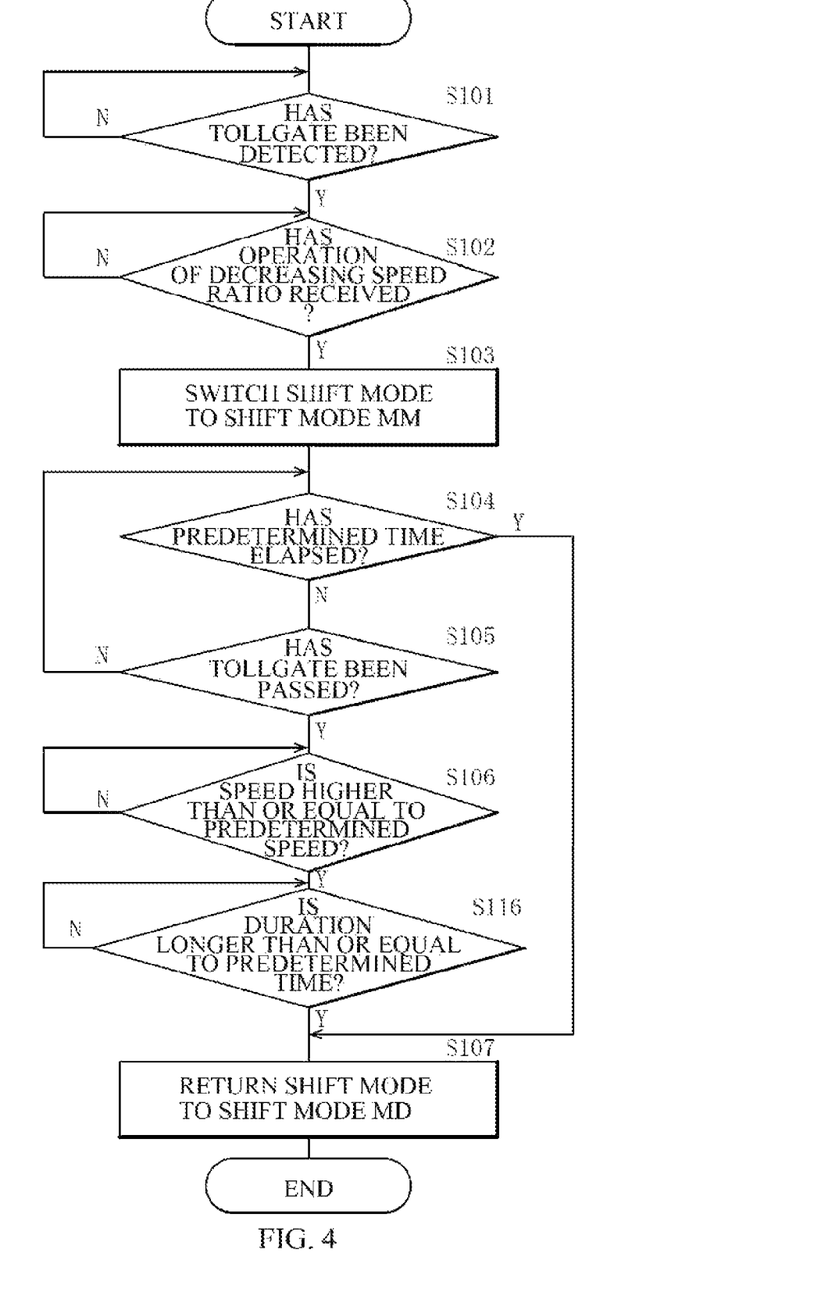
FIG. 4 is a flowchart illustrating an exemplary operation of the shift control device according to one modification example.

In the example embodiment described above, the shift mode control processor 25 may return the shift mode to the shift mode MD in the case where the shift mode control processor 25 determines in step S106 that the speed of the vehicle 9 has become higher than or equal to the predetermined speed ("Y" in step S106); however, this is a non-limiting example. Alternatively, for example, the shift mode control processor 25 may return the shift mode to the shift mode MD in a case where, as illustrated in FIG. 4, a predetermined time has elapsed after the speed of the vehicle 9 has become higher than or equal to the predetermined speed.

According to Modification example 1, the shift mode control processor 25 may check whether or not a time period during which the speed of the vehicle 9 is higher than or equal to the predetermined speed is longer than or equal to the predetermined time (step S116). If the time period is still shorter than the predetermined time ("N" in step S116), the process may repeat step S116 until the time period is longer than or equal to the predetermined time. If the time period is longer than or equal to the predetermined time ("Y" in step S116), the shift mode control processor 25 may return the shift mode to the shift mode MD.

In the shift control device 1, the predetermined condition may include that a length of the time period during which the speed of the vehicle 9 is higher than or equal to the predetermined speed is longer than or equal to the predetermined time. In this case, the vehicle 9 may be sufficiently accelerated. Thus, the shift mode control processor 25 may return the shift mode to the shift mode MD. The shift mode control processor 25 may maintain the shift mode to be in the shift mode MM during the acceleration. Accordingly, the automatic transmission 27 is able to perform the shift operation at the speed ratio corresponding to the paddle operation performed by the driver during the acceleration. As a result, the shift control device 1 is able to perform the shift operation as intended by the driver.

Figure 5:
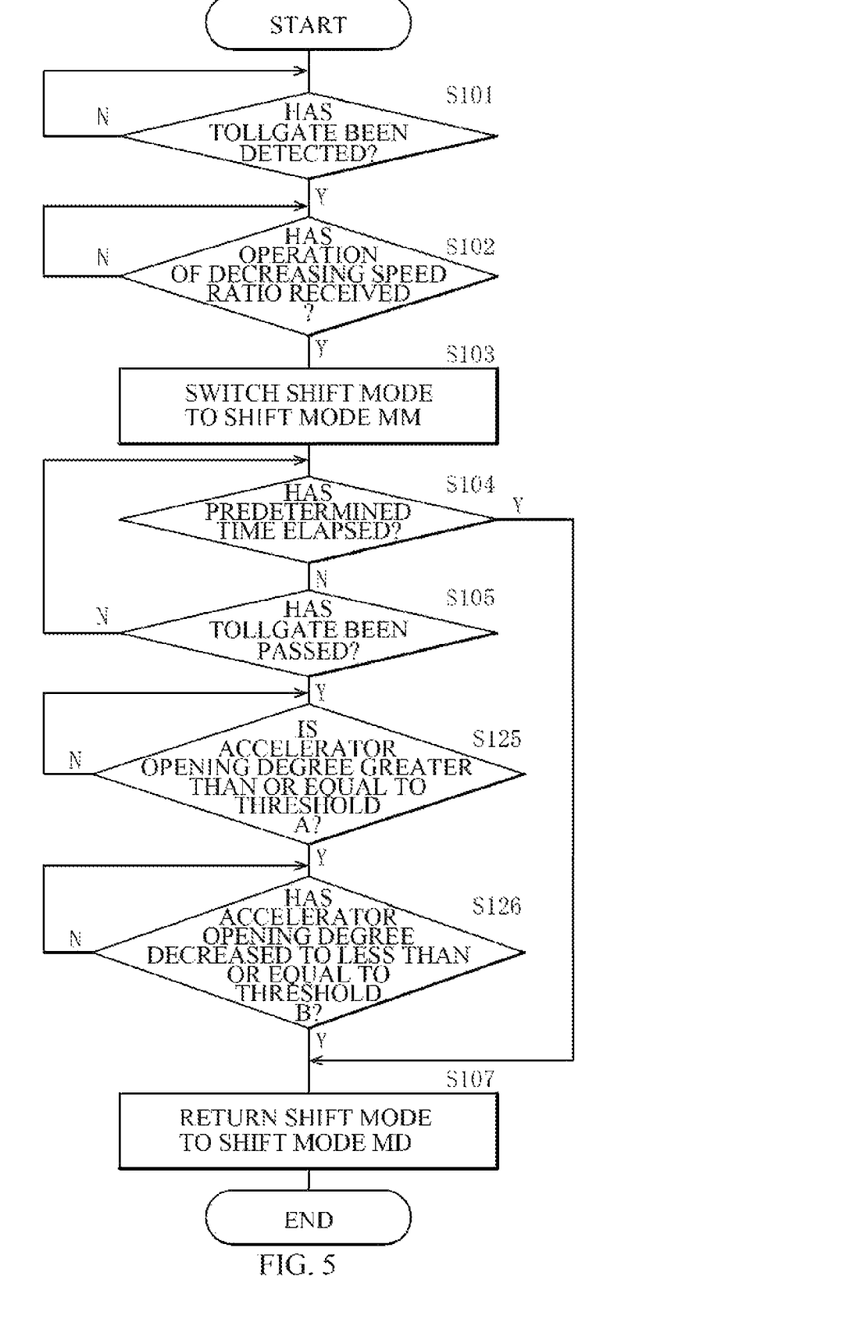
FIG. 5 is a flowchart illustrating an exemplary operation of the shift control device according to one modification example.

In the example embodiment described above, the shift mode control processor 25 may return the shift mode to the shift mode MD in the case where the shift mode control processor 25 determines in step S106 that the condition regarding the speed of the vehicle 9 is satisfied after the vehicle 9 passes through the tollgate; however, this is a non-limiting example. Alternatively, for example, the shift mode control processor 25 may return the shift mode to the shift mode MD in a case where, as illustrated in FIG. 5, a condition regarding an accelerator opening degree is satisfied after the vehicle 9 passes through the tollgate.

According to Modification example 2, the shift mode control processor 25 may check whether or not the accelerator opening degree of the vehicle 9 has become greater than or equal to a threshold A after the vehicle 9 passes through the tollgate (step S125). In other words, after the vehicle 9 passes through the tollgate, the driver may perform the accelerating operation by depressing the accelerator pedal 12. The traveling control unit 24 may accelerate the vehicle 9 by increasing the accelerator opening degree of the engine based on the accelerating operation performed by the driver. The shift mode control processor 25 may check whether or not the accelerator opening degree of the vehicle 9 has become greater than or equal to the threshold A which is, for example, 50%. If the accelerator opening degree is still less than the threshold A ("N" in step S125), the process may repeat step S125 until the accelerator opening degree becomes greater than or equal to the threshold A.

If the accelerator opening degree has become greater than or equal to the threshold A ("Y" in step S125), the shift mode control processor 25 may check whether or not the accelerator opening degree of the vehicle 9 has decreased to less than or equal to a threshold B (step S126). In other words, when the vehicle 9 accelerates sufficiently, the driver may decrease a depression amount of the accelerator pedal 12. The traveling control unit 24 may decrease the accelerator opening degree of the engine based on the operation performed by the driver. The shift mode control processor 25 may check whether or not the accelerator opening degree of the vehicle 9 has become less than or equal to the threshold B which is, for example, 20%. If the accelerator opening degree is greater than the threshold B ("N" in step S126), the process may repeat step S126 until the accelerator opening degree becomes less than or equal to the threshold B.

If the accelerator opening degree has become less than or equal to threshold B in step S126 ("Y" in step S126), the shift mode control processor 25 may return the shift mode to the shift mode MD (step S107).

In the shift control device 1, the predetermined condition may include that there is a time period in which, after the vehicle 9 passes through the tollgate, the accelerator opening degree is greater than or equal to the threshold A which is, for example, 50%. In this case, the vehicle 9 may be estimated to be accelerated to a certain level of speed. In particular, in a case where the predetermined condition includes that the accelerator opening degree has become greater than or equal to the threshold A which is, for example, 50%, and has thereafter become less than or equal to the threshold B which is, for example, 20%, the vehicle 9 may be estimated to be sufficiently accelerated. In a case where such conditions are satisfied, the shift mode control processor 25 may return the shift mode to the shift mode MD. The shift mode control processor 25 may maintain the shift mode to be in the shift mode MM during the acceleration. Accordingly, the automatic transmission 27 is able to perform the shift operation at the speed ratio corresponding to the paddle operation performed by the driver during the acceleration. As a result, the shift control device 1 is able to perform the shift operation as intended by the driver.

In the example embodiment described above, the navigation unit 21 may detect the tollgate of the ETC system ahead of the vehicle 9 and may detect that the vehicle 9 has passed through the tollgate; however, this is a non-limiting example. Alternatively, another unit may detect the tollgate of the ETC system ahead of the vehicle 9 and may detect that the vehicle 9 has passed through the tollgate. Some examples will be described in detail below.

Figure 6:
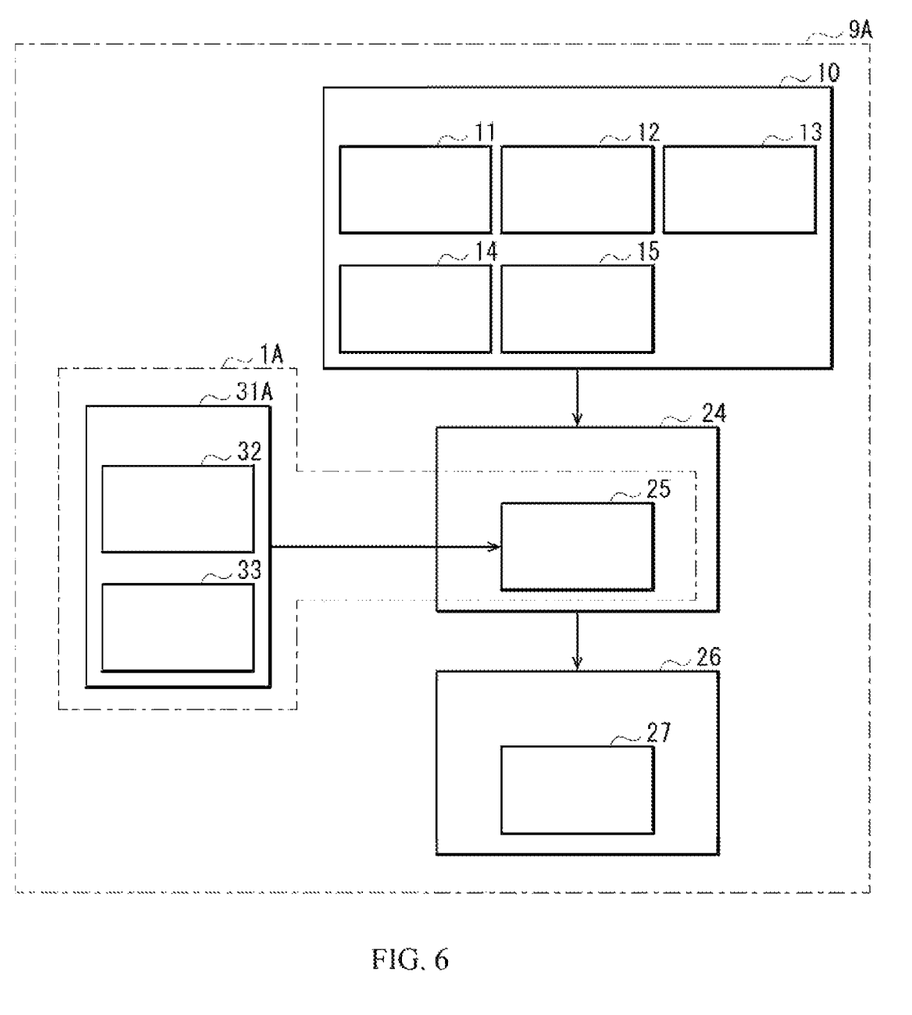
FIG. 6 is a block diagram illustrating an exemplary configuration of a vehicle including a shift control device according to one modification example.

FIG. 6 illustrates an exemplary configuration of a vehicle 9A according to the modification example. The vehicle 9A may include an ETC in-vehicle device 31A. The ETC in-vehicle device 31A may include the communicator 32 and the ETC processor 33. When the vehicle 9 passes through the tollgate, for example, the ETC in-vehicle device 31A may notify the traveling control unit 24 of that fact. The ETC in-vehicle device 31A and the shift mode control processor 25 may constitute a shift control device 1A. In one embodiment, the ETC in-vehicle device 31A may serve as a "detector".

Figure 7:
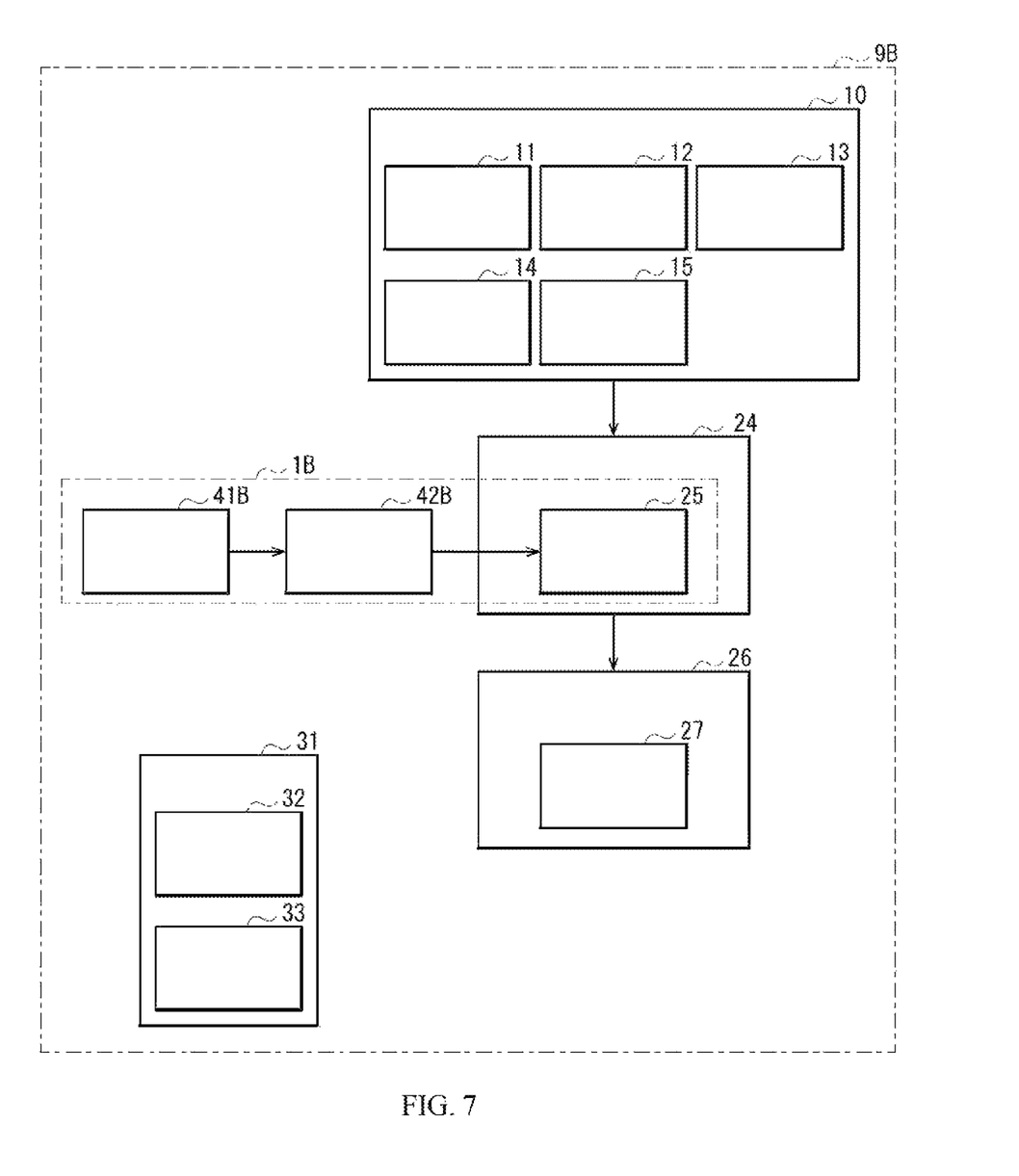
FIG. 7 is a block diagram illustrating an exemplary configuration of a vehicle including a shift control device according to one modification example.

FIG. 7 illustrates an exemplary configuration of a vehicle 9B which is another vehicle according to the modification example. The vehicle 9B may include an imaging unit 41B and a recognition processor 42B. The imaging unit 41B may capture an image of an environment in front of the vehicle 9B, and may include an image sensor and a lens, for example. The recognition processor 42B may recognize a subject in front of the vehicle 9B based on the image captured by the imaging unit 41B. In a case where the recognition processor 42B detects that there is the tollgate of the ETC system ahead of the vehicle 9B, for example, the recognition processor 42B may notify the traveling control unit 24 of the detection. Further, when the vehicle 9B passes through the tollgate of the ETC system, the recognition processor 42B may notify the traveling control unit 24 of that fact. The imaging unit 41B, the recognition processor 42B, and the shift mode control processor 25 may constitute a shift control device 1B. In one embodiment, the imaging unit 41B and the recognition processor 42B may serve as a "detector".

Two or more of modifications described above may be combined.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, an example embodiment has been described above in which the shift mode control processor 25 may return the shift mode to the shift mode MD in the case where the condition regarding the speed of the vehicle 9 is satisfied; however, this is a non-limiting example. Alternatively, for example, the shift mode control processor 25 may return the shift mode to the shift mode MD in a case where one or both of the condition regarding the speed of the vehicle 9 and the condition regarding the accelerator opening degree of the vehicle 9 are satisfied. The condition regarding the speed of the vehicle 9 may include that, as illustrated in FIG. 2, the speed of the vehicle 9 is higher than or equal to the predetermined speed, for example. The condition regarding the accelerator opening degree of the vehicle 9 may include that, as illustrated in FIG. 5, the accelerator opening degree has become greater than or equal to the threshold A and has thereafter become less than or equal to the threshold B, for example.

One or more of the navigation unit 21 and the shift mode control processor 25 illustrated in FIG. 1, the ETC in-vehicle device 31A illustrated in FIG. 6, and the imaging unit 41B and the recognition processor 42B illustrated in FIG. 7 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the navigation unit 21, the shift mode control processor 25, the ETC in-vehicle device 31A, the imaging unit 41B, and the recognition processor 42B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the navigation unit 21 and the shift mode control processor 25 illustrated in FIG. 1, the ETC in-vehicle device 31A illustrated in FIG. 6, and the imaging unit 41B and the recognition processor 42B illustrated in FIG. 7.

The invention claimed is:

1. A shift control device to be applied to a vehicle provided with an automatic transmission, the shift control device comprising:
a detector configured to detect that the vehicle has passed through a tollgate, the tollgate being through which the vehicle is able to pass without stopping; and
a shift mode control processor configured to switch a shift mode of the vehicle from a first shift mode to a second shift mode when the shift mode of the vehicle upon passing through the tollgate is the first shift mode and a predetermined condition regarding one or both of a speed of the vehicle and an accelerator opening degree of the vehicle is satisfied after the vehicle passes through the tollgate, the first shift mode being a mode in which a shift operation is performable by a driver who drives the vehicle, the second shift mode being a mode in which a shift operation is performable by the automatic transmission.

2. The shift control device according to claim 1, wherein the predetermined condition includes that the speed of the vehicle is higher than or equal to a predetermined speed.

3. The shift control device according to claim 2, wherein the predetermined condition includes that a length of a time period during which the speed of the vehicle is higher than or equal to the predetermined speed is longer than or equal to a predetermined time.

4. The shift control device according to claim 1, wherein the predetermined condition includes that there is a time period in which, after the vehicle passes through the tollgate, the accelerator opening degree is greater than or equal to a first threshold.

5. The shift control device according to claim 4, wherein the predetermined condition includes that, after the accelerator opening degree becomes greater than or equal to the first threshold, the accelerator opening degree becomes less than or equal to a second threshold.

6. A shift control device to be applied to a vehicle provided with an automatic transmission, the shift control device comprising circuitry configured to
  detect that the vehicle has passed through a tollgate, the tollgate being through which the vehicle is able to pass without stopping, and
  switch a shift mode of the vehicle from a first shift mode to a second shift mode when the shift mode of the vehicle upon passing through the tollgate is the first shift mode and a predetermined condition regarding one or both of a speed of the vehicle and an accelerator opening degree of the vehicle is satisfied after the vehicle passes through the tollgate, the first shift mode being a mode in which a shift operation is performable by a driver who drives the vehicle, the second shift mode being a mode in which a shift operation is performable by the automatic transmission.

* * * * *